(12) United States Patent
Lambert et al.

(10) Patent No.: US 8,168,257 B2
(45) Date of Patent: May 1, 2012

(54) SYSTEM AND METHOD FOR PRINTING A PATTERN ON FOOTWEAR

(75) Inventors: William Paul Lambert, Topaka, KS (US); Oliver Ma, Taipei (TW); Otto Ting, Taipei (TW); Patrick Liao, Taipei (TW)

(73) Assignee: Payless ShoeSource Worldwide, Inc., Topeka, KS (US)

( * ) Notice: Subject to any disclaimer, the term of this patent is extended or adjusted under 35 U.S.C. 154(b) by 817 days.

(21) Appl. No.: 11/393,455

(22) Filed: Mar. 29, 2006

(65) Prior Publication Data

US 2007/0231491 A1    Oct. 4, 2007

(51) Int. Cl.
*B05D 1/32* (2006.01)
*B05D 5/06* (2006.01)

(52) U.S. Cl. ........ 427/265; 427/272; 427/279; 427/282; 427/385.5; 427/393.5; 427/427.4; 427/427.6; 427/427.7; 264/132; 36/87; 36/98

(58) Field of Classification Search .......... 264/129–137; 36/87, 98; 427/282, 272, 265, 379, 385.5, 427/393.5, 427.4, 427.6, 427.7; 101/127, 101/127.1, 128.1, 128.4, 129; 118/301, 500, 118/502, 504, 505; 106/31.28, 31.4, 31.41, 106/31.42; 441/64

See application file for complete search history.

(56) References Cited

U.S. PATENT DOCUMENTS

| | | | | |
|---|---|---|---|---|
| 2,126,759 A * | 8/1938 | Dreyfus | ........................ | 442/153 |
| 3,370,363 A * | 2/1968 | Kaplan | ........................... | 36/9 R |
| 3,962,387 A | 6/1976 | Hendry | | |
| RE29,265 E | 6/1977 | Hendry | | |
| 4,181,761 A * | 1/1980 | Ishimoto et al. | ................. | 428/31 |
| 4,480,581 A * | 11/1984 | Simmonds et al. | ............. | 118/50 |
| 4,547,406 A * | 10/1985 | Armstrong | ..................... | 427/282 |
| 5,090,320 A * | 2/1992 | Nave | .............................. | 101/485 |
| 5,309,831 A * | 5/1994 | Fuqua et al. | ................... | 101/126 |
| 5,435,764 A * | 7/1995 | Testa et al. | ........................ | 441/64 |
| 6,357,845 B1 * | 3/2002 | Kuwabara et al. | ................. | 347/3 |
| 6,439,536 B1 | 8/2002 | Piccolo | | |
| 6,533,885 B2 * | 3/2003 | Davis et al. | .................... | 156/219 |
| 6,864,033 B2 | 3/2005 | Nakamura et al. | | |
| 6,993,858 B2 * | 2/2006 | Seamans | ........................ | 36/3 A |
| D517,788 S | 3/2006 | Seamans | | |
| D517,789 S | 3/2006 | Seamans | | |
| D517,790 S | 3/2006 | Seamans | | |
| D525,419 S | 7/2006 | Seamans | | |
| 7,146,751 B2 | 12/2006 | Seamans | | |
| D535,088 S | 1/2007 | Seamans | | |
| 2004/0231190 A1 | 11/2004 | Seamans | | |
| 2006/0048407 A1 | 3/2006 | Seamans | | |

FOREIGN PATENT DOCUMENTS

EP    0002311 A2    6/1979

* cited by examiner

*Primary Examiner* — Frederick Parker
*Assistant Examiner* — Alex Rolland
(74) *Attorney, Agent, or Firm* — Lathrop & Gage LLP

(57) ABSTRACT

The invention provides a method for applying a pattern onto the upper of a shoe or other footwear. The footwear is preferably made by injection molding where raw materials are injected into a mold to form the shape of a footwear.

6 Claims, 3 Drawing Sheets

SYSTEM AND METHOD FOR PRINTING A PATTERN ON FOOTWEAR

BACKGROUND

I. Field of the Invention

The present invention relates to footwear made of synthetic resin materials. More particularly, the present invention relates to a system and method that is used to make multicolor footwear by printing a selected portion of the footwear with a durable decorative pattern.

II. Description of the Related Art

Footwear made from light-weight materials such as closed cell resin have gained popularity in recent years. One of the methods to manufacture such footwear is molding where resin is injected into a mold. The resin solidifies and assumes the permanent shape of a footwear. The temperature decreases in the mold. U.S. Reissue Patent Re. 29,265 and U.S. Pat. No. 3,962,387 both issued to Hendry and incorporated by reference herein describe a closed cell foam plastic molding machine for molding articles made of closed cell foam plastic. The Hendry patents describe extrusion equipment for injection molding of granular thermoplastic materials to make foam products. The foam is provided by mixing an inert gas, such as nitrogen, into molten thermoplastic material. Multiple molds may be used with a given injection machine to facilitate rapid processing with extended cooling times for the individual molds.

U.S. Pat. No. 6,439,536 issued to Piccolo is incorporated herein by reference and describes the special problem of molding shoes with expanding plastic materials. A two piece undercut mold with a one piece core define a mold cavity that is fed through filing channels. Expanding plastics, and particularly ethylene vinyl acetate (EVA), may expand from 20% to 80% by volume upon the opening of such molds, where it is desirable to open the molds quickly to avoid product deformation. Alternative plastics for use in these applications at least include polyurethane and PVC. Lateral through-holes may be formed in the shoe upper by the use of side inserts. The base section and the strap of a sectional footwear may be molded separately. The base section made by injection molding may expand in size when removed from the mold, but it usually shrinks as it cools down. U.S. Patent Publication US 2004/0231190 describes a particular coefficient of expansion that is generally desirable when molding EVA shoes. It also discloses a molding process in which the base section and the strap of the footwear are separately molded and then assembled together.

Shoes made by injection molding usually contain one primary color throughout the entire footwear. The category of EVA foam shoe has been fashionable in Italy for quite some time, and has recently become popular in the United States. Part of the popularity arises from the use of brightly colored foam in making these shoes, for example, in vibrant red, green, blue, yellow, pink, neon or orange. This uniform color scheme may be due to the relative simplicity of plasticizing and injecting raw materials of a single color. However, footwear with multiple colors may be desirable because they are stylistically more attractive.

Printing processes may be described as including the direct formation of an image on a substrate. A transfer process is one that commences with this direct image, which may be printed in the manner of a photonegative image, and transfers the image to a second substrate. Where footwear receives perhaps a greater amount of wear and tear than other types of clothing, it is a challenge to provide a durable printed image on footwear by these processes. Direct printing processes, such as drum or screen printing, usually result in the mere transfer of inks or dyes, which are generally less durable than plastic materials.

U.S. Pat. No. 6,864,033 issued to Nakamura et al. is incorporated by reference herein and describes a multicolor image transfer system. High definition laser or thermal printing occurs upon respective sheets that may be provided as a laminate. The various sheets may be coated with thermally or optically sensitive chemical compositions that react to heat or light by changing color. The chemical compositions are generally compatible for use as plastic coatings. In particular, various polymers are used as binders for thermal printing of transfer images. These chemical compositions are coated onto a multilayer support. The monomer unit(s) of the image transfer layer are preferably the same as the monomer units of the image-forming layer and the image-receiving layer to increase the adhesion of these materials, which correspondingly increases recording sensitivity, image quality and transferability of the image. Vinyl acetal, styrene, butyral, and styrene acrylate are preferred monomer units, which are particularly excellent in sensitivity and transferability to paper. Polymers of these monomer units alone or copolymers with other units are preferably used as the binders, e.g., polyvinyl butyral-based and polystyrene-based resins and vinyl chloride-vinyl acetate copolymers can be exemplified as such polymers.

There exists a need for adapting current manufacturing processes to provide a capability of printing a durable pattern on molded plastic shoes to make multi-color footwear. All references cited in this disclosure are hereby incorporated by reference.

SUMMARY

The present disclosure overcomes the problems outlined above by providing a system and method for making a footwear that has a pattern printed on its upper. The pattern may be printed to the upper through a dry film transfer process. Alternatively, the printing may be accomplished in a wet film transfer process. The present disclosure further provides a system and a method to print the pattern on the curved upper of a shoe by using a printing drum that fits the contour of the curved upper.

In one aspect, a method for manufacturing a sectional footwear piece includes molding a base section by injecting raw materials into a mold to form an integral base section that contains an upper and a sole, and chemically coating a selected portion of the upper to form a pattern on the upper. A strap may also be molded in the same injection process and riveting to the upper, in order to provide a pivoting strap. The step of chemically coating may include, for example, spraying the chemical by the action of a jet, rinsing, drum printing or screen printing. In some embodiments, the step of molding may include using an EVA resin to mold the base section, and the step of chemically coating may utilize use of an EVA material for bonding compatibility with the EVA resin. The method may be automated by use of a system as shown and described below.

One object of the present invention is to provide a method so that patterns or pictures may be printed on the upper of a shoe. Another object of this invention is to provide an apparatus to position the shoe during the printing process such that the pattern may be printed within a previously defined boundary. Yet another object is to provide a system so that the printing process can be automated in conjunction with the molding process.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
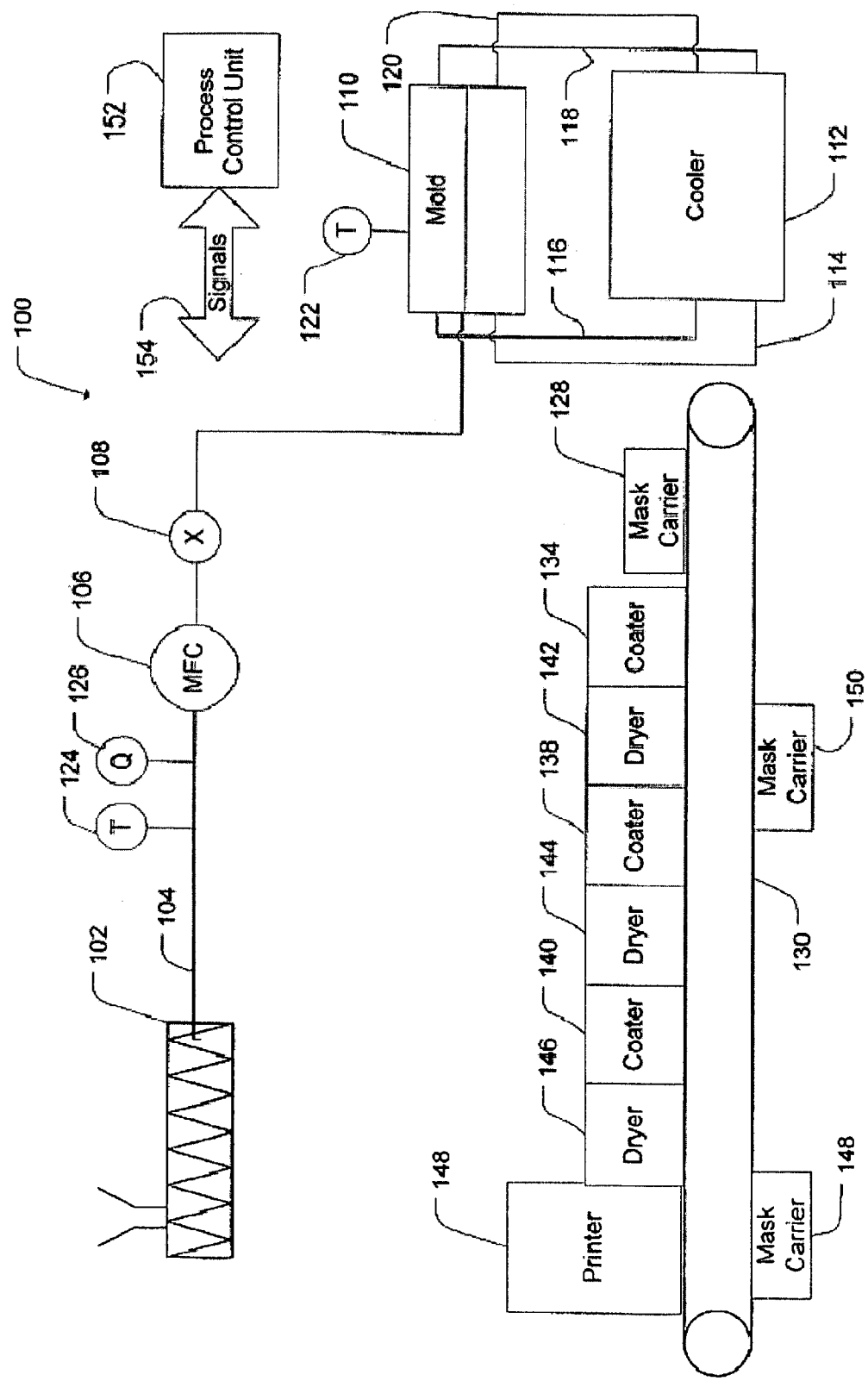
FIG. 1 shows a system for use in making footwear with printed patterns thereon.

There will now be shown and described an injection molding system for making a molded having a printed surface decoration or pattern.

Materials

Raw materials for use in molding the shoes include any resin that is in a flowable state, such as a thermoplastic melt or a chemically reactive casting resin as a liquid, gel or foam. These resins may be used in injection molding processes, spin casting processes, and other processes that use flowable resins. In one embodiment, the resin is ethylene vinyl acetate (EVA) copolymer based material. Preferably, additives are included with the EVA materials to create an expansible material.

Various formulations of ethylene copolymer plastics are well known in the art. One example of such formulations that has been used in undercut molds to make foam products is shown and described in EP0002311 to Gilbey, which is incorporated herein by reference. The Gilbey composition contains an ethylene copolymer resin mixed with from 0.2% to 6% by weight of a crosslinking agent, and this is more preferably from 1% to 4%. There is also 0.2% to 6%, and more preferably from 1% to 4%, by weight of a chemical foaming agent. Typical crosslinking agents used with these polyolefins include, for example, dicumyl peroxide, 1,3bis(tertiarybutylperoxyisopropyl)benzene and 2,5-dimethyl-2,5,-di(tertiary butylperoxy)hexyne-3. Typical chemical foaming agents used in these polyolefins include, for example, azodicarbonamide, p,p'-oxybis(benzenesulphonyl hydrazide) and other materials. The crosslinking agents may be used with such co-agents as triallyl cyanurate or activators including m-phenylenedimaleimide. The foaming agents may be used together with the usual formulation aids, such as oxides, hydroxides or soaps (especially stearates) of such alkaline or alkaline earth metals as magnesium or zinc. Generally the composition is injected into the mould under a pressure of from 1.7 to 70, which is preferably from 6.5 to 35 MN/m$^2$. Prior to the opening of the closed components of the mould, the composition in the mold is preferably heated to a temperature of from 150° C. to 210° C., and this is preferably from 170° C. to 190° C.

The polymer may be a homopolymer of ethylene and is usually made by a free radical initiated polymerization or it may be a copolymer. The preferred polymer is a co polymer of ethylene with up to 25% by weight of an unsaturated ester of a carboxylic acid, and this is more preferably from 5% to 20%. Especially preferred comonomers include vinyl acetate, methyl ethyl esters, or butyl esters of acrylic or methacrylic acids. Preferably the polymers have a melt flow index of from 0.5 to 50 (especially 1 to 10)g/10 minutes as measured according to British Standard 2782, part 1/105C/1976 using a 2.16 Kg load and carried out at 190° C.

The composition may also contain the usual fillers such as chalk, dolomite, barites, talc, clay, wood flour and slate flour, and the usual stabilizers such as antioxidants or light stabilizers, processing aids such stearic acid, pigments and plasticizers such as dioctyl phthalate.

EXAMPLE 1

Eva Copolymer Formulation

The following ingredients may be combined in an extrusion apparatus: (a) 95% by weight of a copolymer of ethylene including 18% by weight (based on the copolymer) of vinyl acetate and having a melt flow index of 2 g/10 minutes; (b) 1.8% by weight of dicumyl peroxide as a crosslinking agent; (c) 1.7% by weight of azod icarbonamide as a chemical foaming agent; (d) 0.75% by weight of zinc oxide to promote a more uniform decomposition of the foaming agent; and 0.75% by weight of stearic acid as a processing aid.

The composition is heated to 115° C. and injected into the mold having closed components which is hereinafter described with reference to the drawings. The mold is hot and is allowed to heat the composition to about 180° C., in order to activate the crosslinking agent and to decompose the chemical foaming agent liberating its nitrogen also at 180° C. The closed components of the mould resist expansion of the liberated nitrogen. After the composition has reached about 180° C., the mold is opened to facilitates expansion of the trapped nitrogen, causing composition to expand as a foam. In consequence of this expansion, the composition moves away from and clears the undercutting surface of the mold, permitting easy removal of the composition from the mold as a crosslinked foam from the mold.

Various coloring agents, as are known in the art, may be mixed with the composition of Example 1 to provide resins of different colors. A variety of plastics dyes and pigments to make virtually any color are available on commercial order from a number of manufacturers, for example, in an extensive assortment of colorants that is commercially available from BASF of Florham Park, N.J. under the Heliogen®, Lithol®; Paliogen®; Paliotol®; Sicomin®; Sicopal®; Sicotan®; Sicotrans®; Variocrom®; Color Variable Pigments™; Eupolen® PE; Eupolen®; Eupolen® PE; Eupolen® PP; Eupolen® PA; Euvinyl®; Oppasin®; Lumogen® F; and Thermoplast/Thermoplast F products. The raw materials may be in liquid, granular or in powder form. For instance, compatible plastic beads, pigments, or dyes may be used to provide a color blend.

System

As shown in FIG. 1, a hopper-equipped screw extruder 102, provides a resin for molding of footwear, such as EVA molded clogs. The resin may be formulated as described above in Example 1, or another polymer resin may be suitable used. The extruder 102 is capable of screw action rendering granular plastics and co-agents into a molten mass of material for use in injection molding. In one embodiment, extruder 102 may provide a white flowable composition and discharge the same into pipe 104. Extruders 102 is alternatively a mixing vessel for a chemically reactive casting resin that is thermally activated.

As shown, the line 104 feeds a corresponding mass flow controller 106 that is set to allocate a predetermined flow rate of the resin composition from extruder 102. Valve 108 opens and close to permit selective flow that feeds a mold 110, which may be a two-part undercut mold with a one-piece core, as shown and described in U.S. Pat. No. 6,439,536. A cooler 112 circulates coolant through input lines 114, 116 and return lines 118, 120. A temperature sensor 122 may be used to provide sense signals for proper opening and closing of the mold 112.

It will be appreciated that the resin compositions from the extruders 102 may be provided or maintained at different temperatures in line 104 to facilitate the molding operation and product appearance. The thermoplastic resins may have different viscosities as a function of temperature, such that it is possible to implement a degree of process control by controlling the upstream temperature, for example, in lines 104. To this end, temperature sensor 124 provides sense signals, which may be used to control a heat exchanger 126 to keep process temperatures within design limits by selective heating or cooling of line 104.

Shoes exiting mold 110 expand to dimensions of the commercial product and are manually placed in a mask carrier 128 on conveyor 130. The mask carrier shields the shoes, shown for example as shoe 132, and operates as a mask to present an exposed portion 134 of the shoe 132 for coating. Conveyor 130 carries the mask carrier 128 and shoe 132 through a series of coating stations 136, 138, 140 each of which are followed by curing stations 142, 144, 146. A plurality of mask carriers 128, 148, 150 may be attached to conveyor 130 according to process throughput requirements.

Each of the coating stations 136, 138, 140 contain instrumentalities for coating the portion 134 of shoe 132 with a thin layer that contains a coloring agent. These instrumentalities may include, for example, a spray coating system, a rinse, web transfer, a drum or a screen printing system to cover all or a limited part of portion 134 with a particular colorant. The curing stations 142, 144, 146 dry or cure the applied coating, and so a series of different coatings may be applied to all or selected parts of portion 134.

Curing station 146 discharges into a printing station 148. Here a laser or thermal print head moves across the surface of portion 134 to activate the coloring agents as needed o produce a color pattern on the exposed surface of portion 134.

The system 100 may be automated for operation as described above by a process control unit 152, which is assembled from conventional components known to the art and may be a wireless digital controller for interaction with other system components previously described through signals 154, for example, in sending control instructions and receiving measurement or status signals. Alternatively, the system 100 may be operated by manual controls (not shown).

Figure 2:
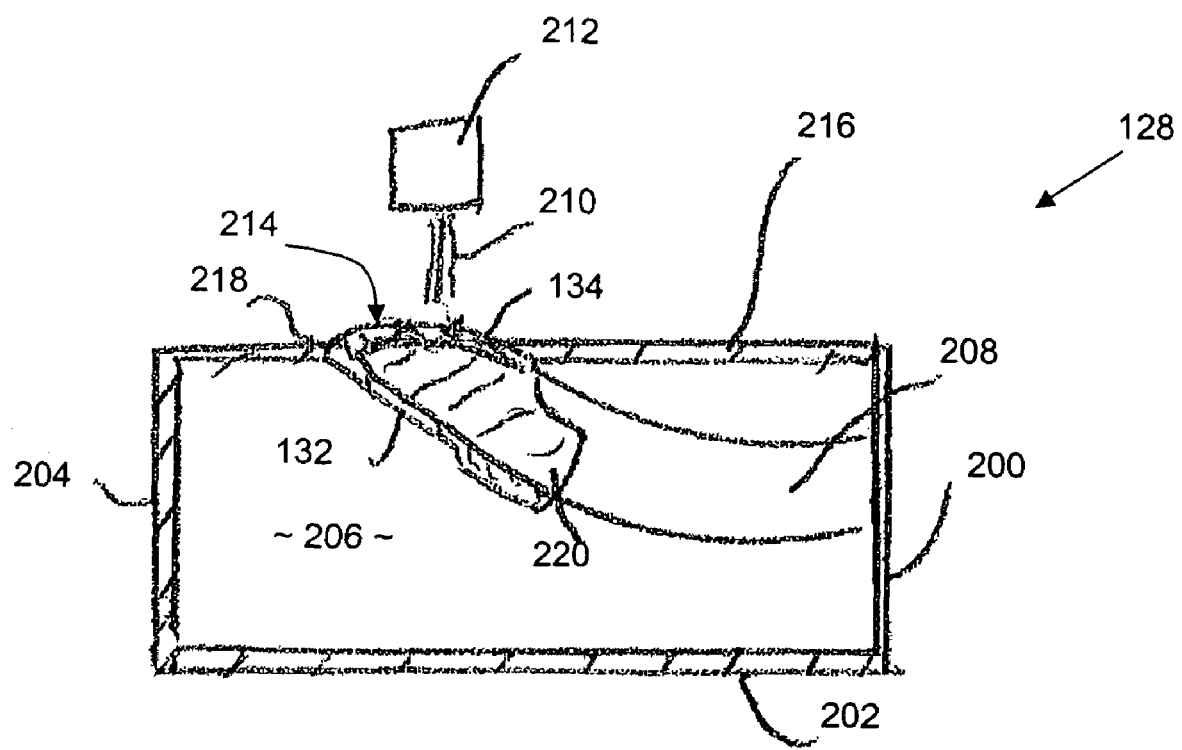
FIG. 2 is a midsectional view of a mask carrier for use in the system of FIG. 1.

FIG. 2 provides additional detail with respect to mask carrier 128, which is shown in midsectional view. Integrally connected sidewalls 200, 202, 204 define an interior cavity 206. A horn 208 protrudes form sidewall 200 and is dimensioned to stretch shoe 132 with sufficient tightness that spray 210 from jet head 212 does not completely penetrate openings 214 in portion 134 of shoes 132. A hingedly connected top is shown in a closed position that seals and separates shoe 132 between the perimeter 218 of exposed portion 134 and the remainder 220 of shoe 132 within cavity 206. This seal at perimeter 218 isolates the remainder 220 from exposure to spray 210. In this context, it will be appreciated that the jet head 212 is shown as one of the instrumentalities for applying a coloring agent within the coating stations 136, 138, 140.

The respective sprays in the coating stations 136, 138, 140 may include various solutions as are known in the art for producing colorant layers. Examples of suitable compositions include the various colorants and other layers as disclosed in U.S. Pat. No. 6,864,033 issued to Nakamura et al. These materials may have an innate color as applied, or the color may be selectively applied by a response to optothermal effects produced by a laser within the printer station 148 with selective targeting of portion 134 to produce a color pattern thereon.

Figure 3:
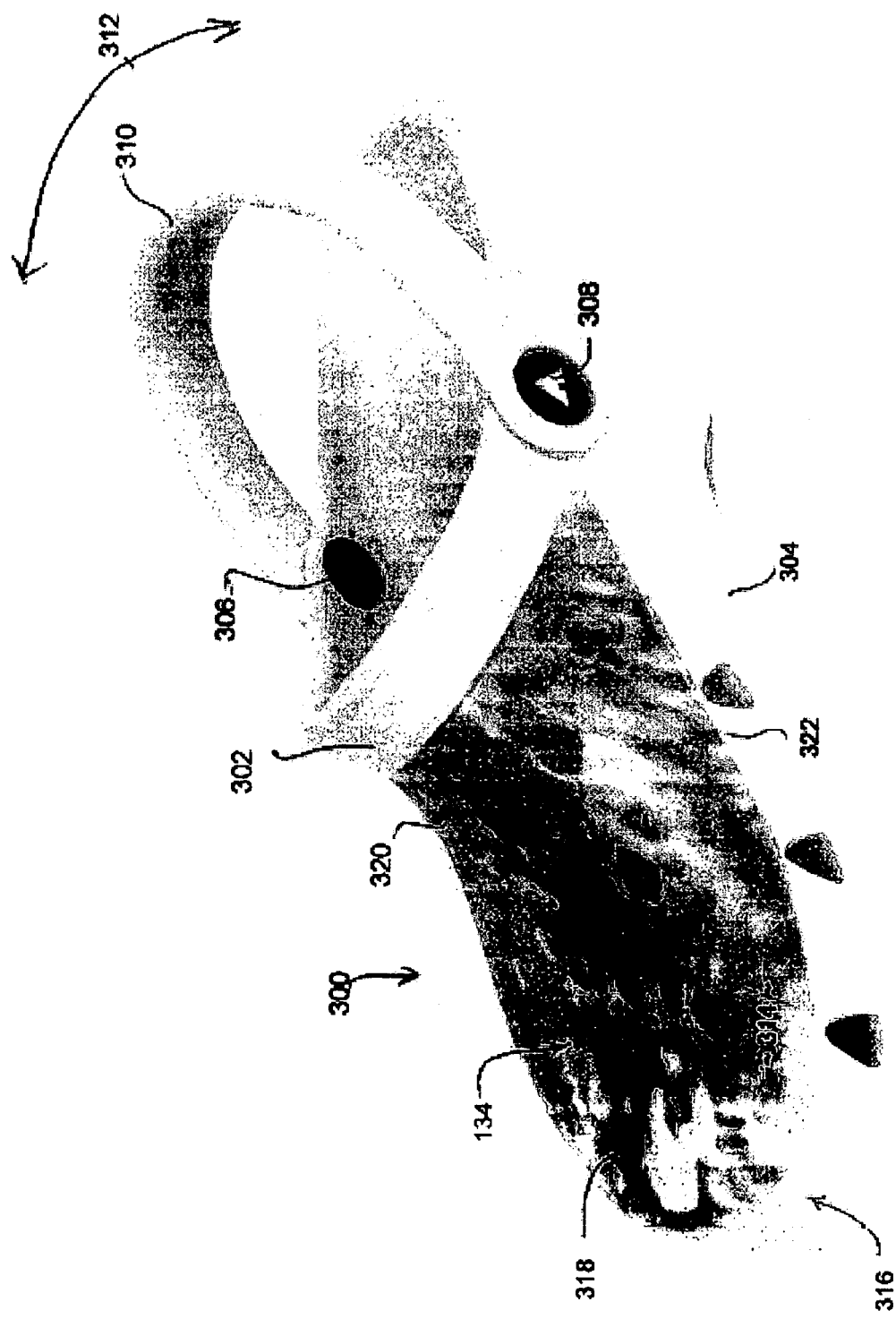
FIG. 3 shows a shoe that may be made by use of the system of FIG. 1.

Operated as described above, the system 100 may provide a shoe 300, as shown in FIG. 3. Shoe 300 is formed as a unitary molded piece having an upper 302 that may also be described as a vamp, and a lower 304 including the sole of the shoe 300. Rivets 306, 308 connect a pivoting strap 310 sufficiently to detain the strap 310 by frictional forces against the upper 302 in any selected pivot position along arc 312. The surface 314 of shoe 300 presents multiple colors on a yellow EVA base material 316, where such colors may include, for example, a tie-die style of pattern including elements of red 318 and green 320. A precise line 322 corresponds to the seal 218 of FIG. 2, to define the exposed portion 134.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

We claim:

1. A method for manufacturing a sectional footwear piece, the method comprising:
    (a) molding a base section by injecting a first ethylene vinyl acetate-based (EVA) resin into a mold to form a unitary molded base section formed of an upper and a sole;
    (b) expanding the base section by removal of the base section from the mold,
    (c) masking the upper by placing the base section on a horn with sufficient tightness that spray cannot completely penetrate openings in the base section; and
    (d) thereafter spray coating a selected portion of said upper with a liquid EVA material mixed with a colorant to impart bonding compatibility with the upper and to form a pattern on the upper.

2. The method of claim 1, further comprising a step of molding a strap and riveting the strap to the upper to provide a pivoting strap.

3. The method of claim 1, wherein the step of spray coating includes spraying the EVA material by the action of a jet.

4. The method of claim 1, wherein the step of spray coating includes using a plurality of EVA materials of different colors to form the pattern as a decorative image.

5. The method of claim 1, wherein the step of spray coating includes using a rinse.

6. The method of claim 1, wherein the step of spray coating includes curing the applied coating followed by repeating the step of spray coating with another EVA material to produce a multi-colored pattern.

* * * * *

UNITED STATES PATENT AND TRADEMARK OFFICE
CERTIFICATE OF CORRECTION

PATENT NO.           : 8,168,257 B2
APPLICATION NO.      : 11/393455
DATED                : May 1, 2012
INVENTOR(S)          : William Paul Lambert et al.

Page 1 of 1

It is certified that error appears in the above-identified patent and that said Letters Patent is hereby corrected as shown below:

Column 3, line 17, "molded" should read --mold--; line 51 and 53, "mould" should
   read --mold--; line 59, "co polymer" should read --copolymer--;
Column 4, line 4, "such stearic acid" should read --such as stearic acid--;
   line 9, "Eva" should read --EVA--; line 26, "mould" should read --mold--;
   line 28, "facilitates" should read --facilitate--; line 54, "used" should read --use--;
Column 5, line 37, "needed o" should read --needed to--; line 50, "form" should
   read --from--;

Signed and Sealed this
Third Day of July, 2012

David J. Kappos
*Director of the United States Patent and Trademark Office*